(12) United States Patent
Agarwal et al.

(10) Patent No.: US 10,015,101 B2
(45) Date of Patent: Jul. 3, 2018

(54) PER QUEUE PER SERVICE BUFFERING CAPABILITY WITHIN A SHAPING WINDOW

(71) Applicant: Ciena Corporation, Hanover, MD (US)

(72) Inventors: Shivam Agarwal, Allahabad (IN); Himanshu Premi, Delhi (IN); Tushar Ruhela, Delhi (IN)

(73) Assignee: Ciena Corporation, Hanover, MD (US)

( * ) Notice: Subject to any disclaimer, the term of this patent is extended or adjusted under 35 U.S.C. 154(b) by 139 days.

(21) Appl. No.: 15/005,085

(22) Filed: Jan. 25, 2016

(65) Prior Publication Data
US 2017/0171089 A1    Jun. 15, 2017

(30) Foreign Application Priority Data

Dec. 11, 2015   (IN) .......................... 4062/DEL/2015

(51) Int. Cl.
*H04L 12/815* (2013.01)
*H04L 12/865* (2013.01)
*H04L 12/851* (2013.01)

(52) U.S. Cl.
CPC .......... *H04L 47/22* (2013.01); *H04L 47/2433* (2013.01); *H04L 47/6275* (2013.01)

(58) Field of Classification Search
None
See application file for complete search history.

(56) References Cited

U.S. PATENT DOCUMENTS

| | | | | |
|---|---|---|---|---|
| 6,463,068 | B1* | 10/2002 | Lin | H04L 45/00 370/230 |
| 7,088,678 | B1* | 8/2006 | Freed | H04L 47/10 370/230 |
| 2010/0296398 | A1* | 11/2010 | Pan | H04L 47/10 370/232 |
| 2011/0087915 | A1* | 4/2011 | Zhang | H04L 12/1854 714/2 |
| 2014/0269284 | A1* | 9/2014 | Amanna, III | H04L 5/0037 370/230.1 |

OTHER PUBLICATIONS

IEEE, Virtual Bridged Local Area Networks, May 19, 2006, IEEE Computer Society, IEEE Std 802.1Q-2005.*
B. Braden et al.,"Recommendations on Queue Management and Congestion Avoidance in the Internet," The Internet Society (1998), Apr. 1998.
S. Blake et al., "An Architecture for Differentiated Services," The Internet Society (1998), Dec. 1998.

* cited by examiner

*Primary Examiner* — Derrick Ferris
*Assistant Examiner* — The Hy Nguyen
(74) *Attorney, Agent, or Firm* — Clements Bernard Walker PLLC; Christopher L. Bernard; Lawrence A. Baratta, Jr.

(57) ABSTRACT

Systems and methods for per queue per service buffering capability for traffic shaping include receiving an ingress packet; responsive to no traffic shaping, providing the ingress packet to an output interface; and, responsive to traffic shaping, performing one of sending the ingress packet to the output interface, buffering the ingress packet in a queue based on service priority, and dropping the ingress packet. The traffic shaping can include one of a token bucket algorithm and a leaky bucket algorithm.

18 Claims, 6 Drawing Sheets

PER QUEUE PER SERVICE BUFFERING CAPABILITY WITHIN A SHAPING WINDOW

CROSS-SECTION TO RELATED APPLICATION(S)

The present patent application/patent claims the benefit of priority of Indian Patent Application No. 4062/DEL/2015, filed on Dec. 11, 2015, and entitled "PER QUEUE PER SERVICE BUFFERING CAPABILITY WITHIN A SHAPING WINDOW," the contents of which are incorporated in full by reference herein.

FIELD OF THE DISCLOSURE

The present disclosure generally relates to networking systems and methods. More particularly, the present disclosure relates to per queue, per service buffering capability within a shaping window.

BACKGROUND OF THE DISCLOSURE

Per egress queue shaping enables regulating data transfer in order to maintain a certain level of performance, quality of service (QoS). Traffic shaping allows controlling the speed of traffic that is egressing an interface. This way, a user can match the flow of the traffic to the speed of the interface that is receiving the packet. Traffic shaping provides a mechanism to queue packets in a data buffer that arrive but cannot be sent immediately. A shaping mechanism can include the token bucket algorithm.

Conventionally, shaping occurs at an egress queue; thus packets will be buffered randomly in the queue to regulate the traffic flow according to the desired rate irrespective of the service from where the traffic is coming. A user has no capability to give the precedence to one service over another service during shaping at the same egress queue. Instead, the user has the capability to provision different shaping profiles across queues, but no flexibility to provide precedence to service on the same egress queue. Due to this limitation, the user is unable to prioritize traffic coming from different services to a single queue within a shaping window; hence, traffic from different services will be buffered randomly within the shaping window.

For example, assume packets are coming from different services on the same egress queue at the following rate, such as Service A=2 Packets, Service B=2 Packets, Service C=2 Packets, and Total=6 Packets Ingress. Assume the egress queue is left with space for only 2 packets. In this scenario, out of these 6 packets, 2 packets will be chosen randomly from any of the 3 services (A, B & C) and will be buffered in the egress queue. Thus, conventionally, the user has no control over the queueing of packets pertaining to a particular service. In this scenario, traffic from different services coming to a single queue will be buffered randomly within the shaping window and the user does not have any control.

One existing solution includes creating new queues with different queue groups. The different queue groups is allocated for different services which then apply shaping on different services. However, this solution is not scalable because resources are required on hardware for new queue creation which is always limited. It would be advantageous for a solution that does not require new queue creation, i.e., a solution that is independent of the hardware resources. Also, this solution can handle only one service per queue; it would be advantageous to handle multiple services per queue. However, even if a user provisions more than one service to a created queue group, conventionally, the same aforementioned issue remains of having no control to prioritize these two services among themselves for the purpose of buffering within the shaping window.

BRIEF SUMMARY OF THE DISCLOSURE

In an exemplary embodiment, a method for per queue per service buffering capability for traffic shaping includes receiving an ingress packet; responsive to no traffic shaping, providing the ingress packet to an output interface; and, responsive to traffic shaping, performing one of sending the ingress packet to the output interface, buffering the ingress packet in a queue based on service priority, and dropping the ingress packet. The traffic shaping can include one of a token bucket algorithm and a leaky bucket algorithm. Responsive to the traffic shaping, the sending the ingress packet to the output interface is performed if tokens are available and tokens are deducted based on a size of the ingress packet. The queue can support traffic including a plurality of services, and wherein each of the plurality of services has an associated priority used by the service priority to determine whether or not to buffer the ingress packet. The queue can supports traffic including a plurality of services defined through any of Virtual Local Area Network (VLAN) identifiers, service identifiers in IEEE 802.1ah, a Type of Service (ToS) in IP headers, and tunnel identifiers. The service priority can be one of user-defined, determined from Differentiated Services (Diff-Serv), and based on IEEE 802.1Q priority. The service priority can be utilized to differentiate data traffic and control traffic on the queue to provide a higher priority for the control traffic. The service priority can be utilized to differentiate voice traffic and video traffic on the queue to provide a higher priority for the voice traffic. The service priority can be utilized to make the queue behave like strict priority by provisioning highest priority to a first service such that traffic for the first service gets buffered first and will be dropped only when the queue is left with no room to buffer any further packets.

In another exemplary embodiment, an apparatus for per queue per service buffering capability for traffic shaping includes circuitry adapted to receive an ingress packet; circuitry adapted to, responsive to no traffic shaping, provide the ingress packet to an output interface; and circuitry adapted to, responsive to traffic shaping, perform one of send the ingress packet to the output interface, buffer the ingress packet in a queue based on service priority, and drop the ingress packet. The traffic shaping can include one of a token bucket algorithm and a leaky bucket algorithm. Responsive to the traffic shaping, the ingress packet can be sent to the output interface if tokens are available and tokens are deducted based on a size of the ingress packet. The queue can support traffic including a plurality of services, and wherein each of the plurality of services has an associated priority used by the service priority to determine whether or not to buffer the ingress packet. The queue can support traffic including a plurality of services defined through any of Virtual Local Area Network (VLAN) identifiers, service identifiers in IEEE 802.1ah, a Type of Service (ToS) in IP headers, and tunnel identifiers. The service priority can be one of user-defined, determined from Differentiated Services (Diff-Serv), and based on IEEE 802.1Q priority. The service priority can be utilized to differentiate data traffic and control traffic on the queue to provide a higher priority for the control traffic. The service priority can be utilized to differentiate voice traffic and video traffic on the queue to provide a higher priority for the voice traffic. The service priority can be utilized to make the queue behave like strict priority by provisioning highest priority to a first service such that traffic for the first service gets buffered first and will be dropped only when the queue is left with no room to buffer any further packets.

In a further exemplary embodiment, a node adapted for per queue per service buffering capability for traffic shaping includes one or more line ports including circuitry adapted to receive an ingress packet; and circuitry adapted to, responsive to no traffic shaping, provide the ingress packet to an output interface; and circuitry adapted to, responsive to traffic shaping, perform one of send the ingress packet to the output interface, buffer the ingress packet in a queue based on service priority, and drop the ingress packet. The traffic shaping can include one of a token bucket algorithm and a leaky bucket algorithm.

BRIEF DESCRIPTION OF THE DRAWINGS

The present disclosure is illustrated and described herein with reference to the various drawings, in which like reference numbers are used to denote like system components/method steps, as appropriate, and in which.

DETAILED DESCRIPTION OF THE DISCLOSURE

Again, in various exemplary embodiments, the present disclosure relates to per queue, per service buffering capability within a shaping window. Again, conventionally, for a particular queue, the user is unable to prioritize the traffic within the shaping window based on the services the traffic is coming from. The systems and methods described herein provide the capability to a user to prioritize one service over others within a particular queue according to needs based on service priority. This enables the user to give more importance to a particular service to get buffered within the shaping window. Exemplary uses cases include 1) if both data traffic and control traffic land on the same queue, the user has the option to provide higher priority to control traffic; 2) for High-Quality video over Low-Quality video traffic, consider a scenario where a single user sends two streams, one corresponding to high-quality video while the other to low quality video, the user could provide more precedence to the high-quality video over the low-quality video in case of shaping to give precedence to high-quality video; 3) for a service, the user shall have the flexibility to make the shaping queue behave like strict priority by provisioning the highest priority, within a queue, to the service in question, thus traffic for this service will get buffered first and will be dropped only when shaping queue is left with no room to buffer any further packets; etc.

Figure 1:
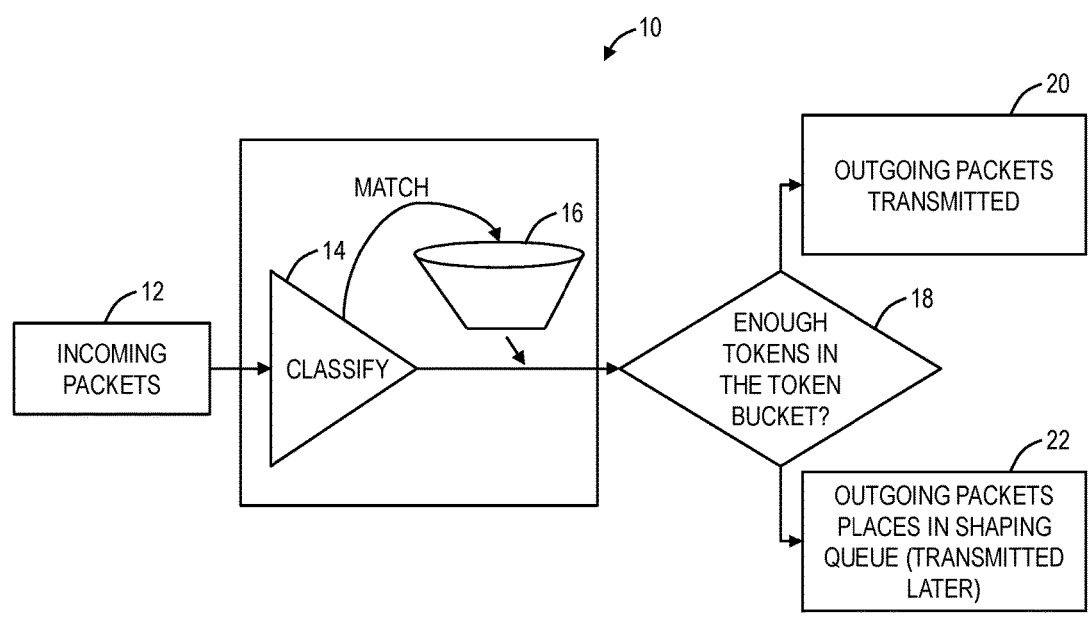
FIG. 1 is a diagram that functionally illustrates a token bucket algorithm for traffic shaping in a queue.

Referring to FIG. 1, in an exemplary embodiment, a diagram functionally illustrates a token bucket algorithm for traffic shaping in a queue 10. Traffic shaping (also known as "packet shaping") is a network traffic management technique which delays some or all packets to bring them into compliance with the desired traffic profile. Traffic shaping is used to optimize or guarantee performance, improve latency, and/or increase usable bandwidth for some kinds of packets by delaying other kinds. It is often confused with traffic policing, the distinct but related practice of packet dropping and packet marking. The token bucket is an algorithm which is used to check that data transmissions, in the form of packets, conform to defined limits on bandwidth and burstiness (a measure of the unevenness or variations in the traffic flow). It can also be used as a scheduling algorithm to determine the timing of transmissions that will comply with the limits set for the bandwidth and burstiness.

The token bucket algorithm is based on an analogy of a fixed capacity bucket into which tokens, normally representing a unit of bytes or a single packet of predetermined size, are added at a fixed rate. When a packet is to be checked for conformance to the defined limits, the bucket is inspected to see if it contains sufficient tokens at that time. If so, the appropriate number of tokens, e.g., equivalent to the length of the packet in bytes, are removed ("cashed in:), and the packet is passed, e.g., for transmission. The packet does not conform if there are insufficient tokens in the bucket, and the contents of the bucket are not changed. Non-conformant packets can be treated in various ways including dropping, enqueuing for subsequent transmission when sufficient tokens have accumulated in the bucket, or transmitted, but marked as being non-conformant, possibly to be dropped subsequently if the network is overloaded. A conforming flow can thus contain traffic with an average rate up to the rate at which tokens are added to the bucket, and have a burstiness determined by the depth of the bucket. This burstiness may be expressed in terms of either a jitter tolerance, i.e. how much sooner a packet might conform (e.g. arrive or be transmitted) than would be expected from the limit on the average rate, or a burst tolerance or maximum burst size, i.e., how much more than the average level of traffic might conform in some finite period.

In FIG. 1, incoming packets 12 are classified 14 with packet classification criteria applied. In the token bucket algorithm, tokens are put into a bucket 16 at a certain rate. The bucket 16 itself has a specified capacity. If the bucket 16 fills to capacity, newly arriving tokens are discarded. To send a packet, a regulator must remove from the bucket 16 a number of tokens equal in representation to the packet size (steps 18, 20). If there are not enough tokens in the bucket to send a packet (step 18), the packet waits until the bucket has enough tokens (step 22). If the bucket 16 is already full of tokens, incoming tokens overflow and are not available for future packets. Thus, at any time, the largest burst a source can send into the network is roughly proportional to the size of the bucket.

Shaping when applied on an egress queue at a specified shaping rate, allows for the packets to be egressed from the queue at a constant rate (shaping rate) irrespective of the ingress traffic rate and traffic bursts. To achieve constant egress rate, shaping uses egress queue to buffer the extra packets for the time till shaper can schedule them or till the egress queue capacity. Above the queue capacity, the queue dropping mechanisms, say for example tail dropping, comes into effect.

Figure 2:
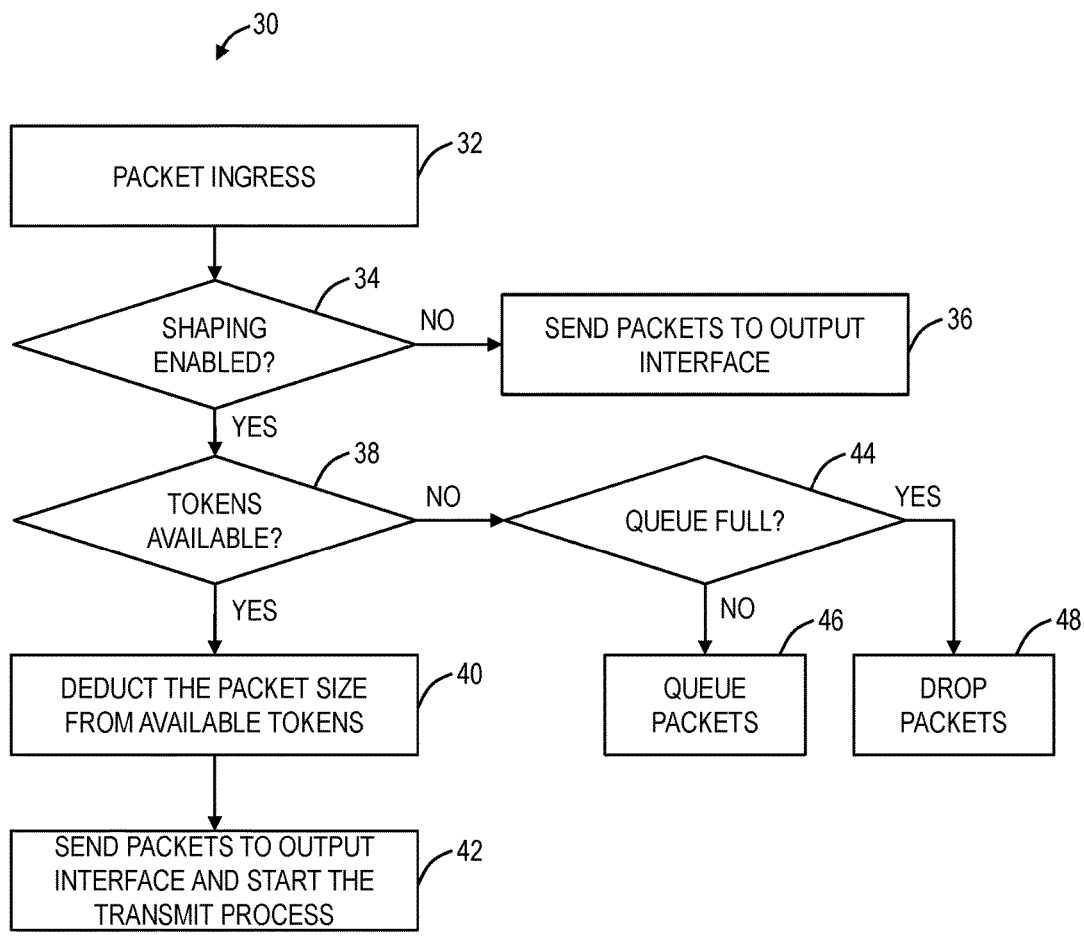
FIG. 2 is a flowchart of a per egress queue shaping process to regulate the data transfer in order to maintain a certain level of performance, quality of service (QoS)

Referring to FIG. 2, in an exemplary embodiment, a flowchart illustrates a per egress queue shaping process 30 to regulate the data transfer in order to maintain a certain level of performance, quality of service (QoS). The shaping process 30 allows controlling the speed of traffic that is egressing an interface. This way, the user can match the flow of the traffic to the speed of the interface that is receiving the packet. Traffic shaping provides a mechanism to queue packets in the data buffer that arrive but cannot be sent immediately. Specifically, the queue shaping process 30 can operate on circuitry associated with a traffic queue.

The queue shaping process 30 includes packets ingressing (step 32). If shaping is not enabled (step 34), the packets are sent to an output interface (step 36). If shaping is enabled (step 34), the queue shaping process 30 includes checking if tokens are available (step 38), and if so, the queue shaping process 30 includes deducting the packet size from the available tokens (step 40) and sending the packets to the output interface and starting the transmit process (step 42). If there are no tokens available (step 38), the queue shaping process 30 includes checking if the queue is full (step 44), and if not, the packets are queued (step 46), and if so, the packets are dropped (step 48).

The queue shaping process 30 allows these extra packets to be buffered in a random fashion at the egress queue irrespective of the services from which they are coming. Again, conventionally, the user has no control/capability to give the precedence to one service over another service at the same egress queue. However, the user does have the capability to provision different shaping profiles across queues but no flexibility to provide precedence to service on the same egress queue. Shaping can be done either using the token bucket algorithm (shown in the queue shaping process 30) or the leaky bucket algorithm. But irrespective of the algorithm used for shaping, those extra packets, conventionally, will always be buffered in egress queue in a random fashion irrespective of the service the packet is coming from on the same queue. That is, shaping is currently implemented in service unaware mode, i.e., within the shaping window, traffic will be buffered in the queue randomly irrespective of the services from where it is coming.

Figure 3:
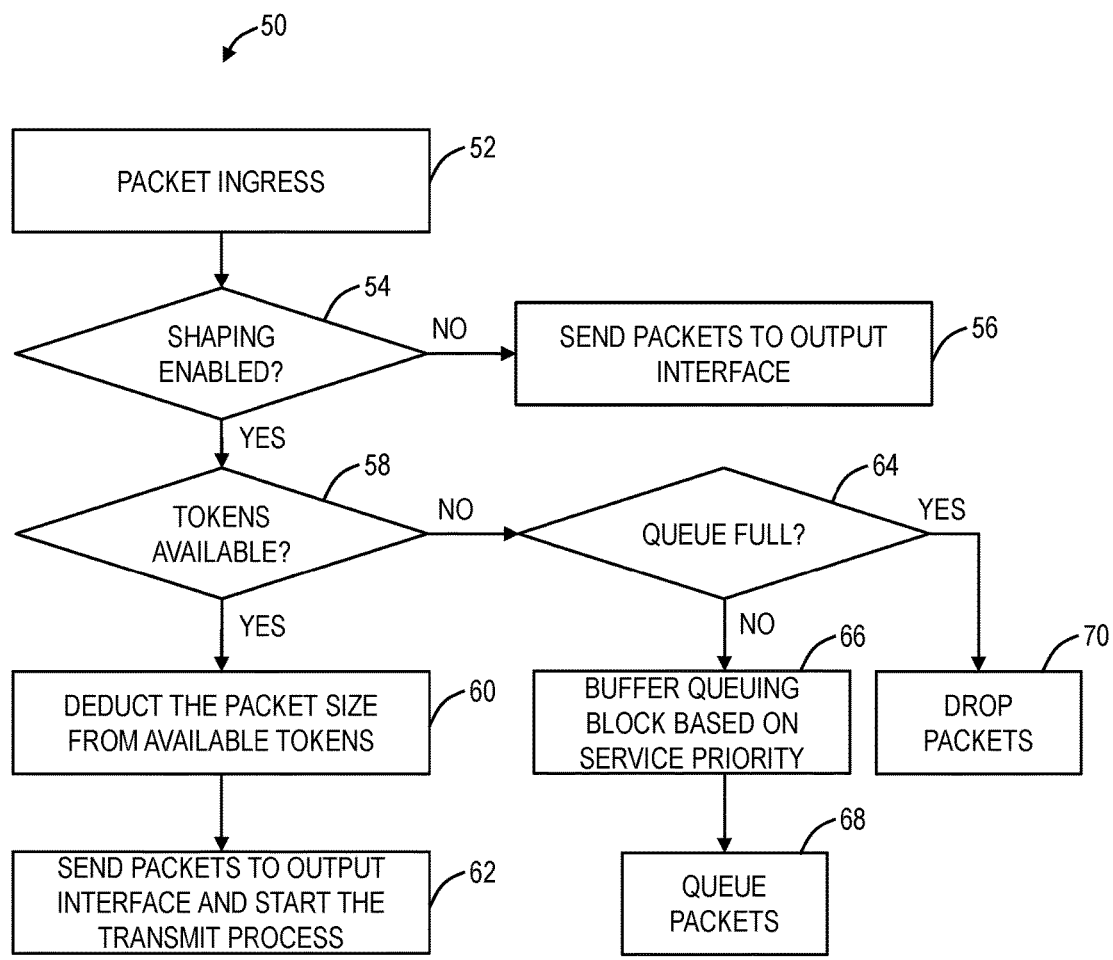
FIG. 3 is a flowchart illustrates a per egress queue shaping process to regulate the data transfer in order to maintain a certain level of performance, quality of service (QoS), with a provision priority-based buffering capability.

Referring to FIG. 3, in an exemplary embodiment, a flowchart illustrates a per egress queue shaping process 50 to regulate the data transfer in order to maintain a certain level of performance, quality of service (QoS), with a provision priority-based buffering capability. Accordingly, the queue shaping process 50 provides the user the flexibility to provide precedence to one service over another service landing on the same egress queue.

The queue shaping process 50 includes packets ingressing (step 52). If shaping is not enabled (step 54), the packets are sent to an output interface (step 56). If shaping is enabled (step 54), the queue shaping process 50 includes checking if tokens are available (step 58), and if so, the queue shaping process 50 includes deducting the packet size from the available tokens (step 60) and sending the packets to the output interface and starting the transmit process (step 62). If there are no tokens available (step 58), the queue shaping process 50 includes checking if the queue is full (step 64), and if not, buffer queuing is based on service priority (step 66) and the packets are queued (step 68), and if so, the packets are dropped (step 70). The step 66 can be a buffer queueing block based on service priority, i.e., circuitry or the like which determines buffering order based on priority for the VLAN/Services.

For example, under the queue shaping process 50, consider the same scenario mentioned above in which 6 packets are coming from 3 different VLAN's/Services (A, B, and C) at the same queue and the queue has space to buffer only for 2 packets. Now, as part of the queue shaping process 50, some priority is assigned to each VLAN/Service. For example, assign some priority from 0 to 7 to each service in order to decide which packet should be buffered in the queue during the shaping window. Now, during shaping, those 6 ingress packets need to be buffered in the egress queue which has buffer space for only 2 packets. Now, the aim of the queue shaping process 50 is to prioritize these incoming packets of different services. There is a priority assigned to each service, and these incoming packets will be buffered according to the priority assigned to the services.

For example, the VLAN's/Services (A, B, and C) can be assigned priority as follows:

| | |
|---|---|
| Service A | Priority 3 |
| Service B | Priority 0 (lowest) |
| Service C | Priority 7 (highest) |

Again, there could be an existing solution where there are dedicated shaping queues for each service. But this solution is different from the queue shaping process 50 which includes using the same shaping queue instead of single service using a dedicated shaping queue. Also, solutions that are aimed at provisioning dedicated shaping queues to single service are not scalable; whereas the queue shaping process 50 is scalable because the queue shaping process 50 is not sticking shaping queues to a single service, but rather a single shaping queue could be shared among various services.

Figure 4:
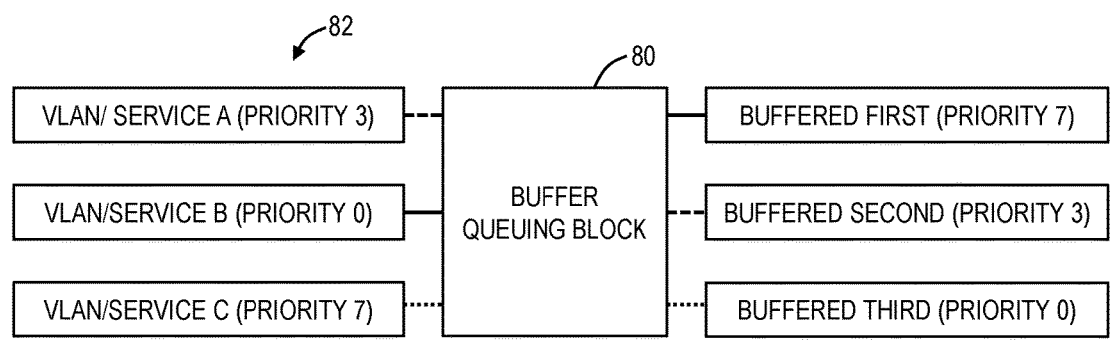
FIG. 4 is a block diagram of an exemplary implementation of a buffer queueing block.

Referring to FIG. 4, in an exemplary embodiment, a block diagram illustrates an exemplary implementation of a buffer queuing block 80. The buffer queuing block 80 can include circuitry, logic, etc. which as part of the queue shaping process 50 can perform the step 66 to determine which packets from different VLANs/Services are buffered first based on assigned priority.

The buffer queuing block 80 checks the priority of the services (either assigned by the user or determined from the packet's header), and then based on the priority, the queue shaping process 50 will first buffer the packet of service assigned the higher priority after the next higher priority service will be buffered and so on. Thus, in this example, the buffer queuing block 80 has the services A, B, C with priorities 3, 0, 7, respectively. The buffer queuing block 80 determines the service C is buffered first, the service A is buffered second, and finally, the service B is buffered last.

The queue shaping process 50 and the buffer queuing block 80 can be implemented in any packet device, switch, hardware, circuit, etc. It is also possible the buffer queuing block 80 could be incorporated in Metro Ethernet Forum (MEF) services.

The buffer queuing block 80 is additional service priority logic that is utilized within a current shaping window to address the shortcomings described herein, so a user is able to prioritize the traffic of different services within a particular queue according to specific needs. The user will be given the capability to provide priority to the services. Now, when the shaper is applied and the queue shaping process 50 needs to buffer some packets in the queue to regulate the traffic flow, the buffer queuing block 80 will decide whether the packet shall be buffered or dropped based on the priority assigned to each service by the user. Highest Priority traffic will be queued first then the next higher priority traffic will be queued and so on till the queue capacity.

The buffer queuing block 80 and the queue shaping process 50 contemplates operation on/with any switch, router, node, network element, etc. that supports traffic shaping. That is, the buffer queuing block 80 and the queue shaping process 50 can be utilized with any buffer, queue, circuit, logic, etc. that queues packets and implements traffic shaping. The buffer queuing block 80 and the queue shaping process 50 enable a user to provision priority-based dropping for per queue per service within the shaping window. Accordingly, the user has the flexibility to provide precedence to one service over another service for buffering on the same egress queue.

Priority can be assigned to each VLAN/Service by a user, determined from existing characteristics of the services, etc. The services can be distinguished in the traffic via 1) Virtual Local Area Network (VLAN) identifiers, 2) service identifiers such as from IEEE 802.1ah, 3) Type of Service (ToS) in IP headers, 4) tunnel identifiers, and the like. The priority can be 1) user-defined where the user can prioritize traffic on the basis of the source/ingress port, 2) determined from Differentiated Services (Diff-Serv), 3) based on IEEE 802.1Q priority (0 to 7), and the like.

Figure 5:
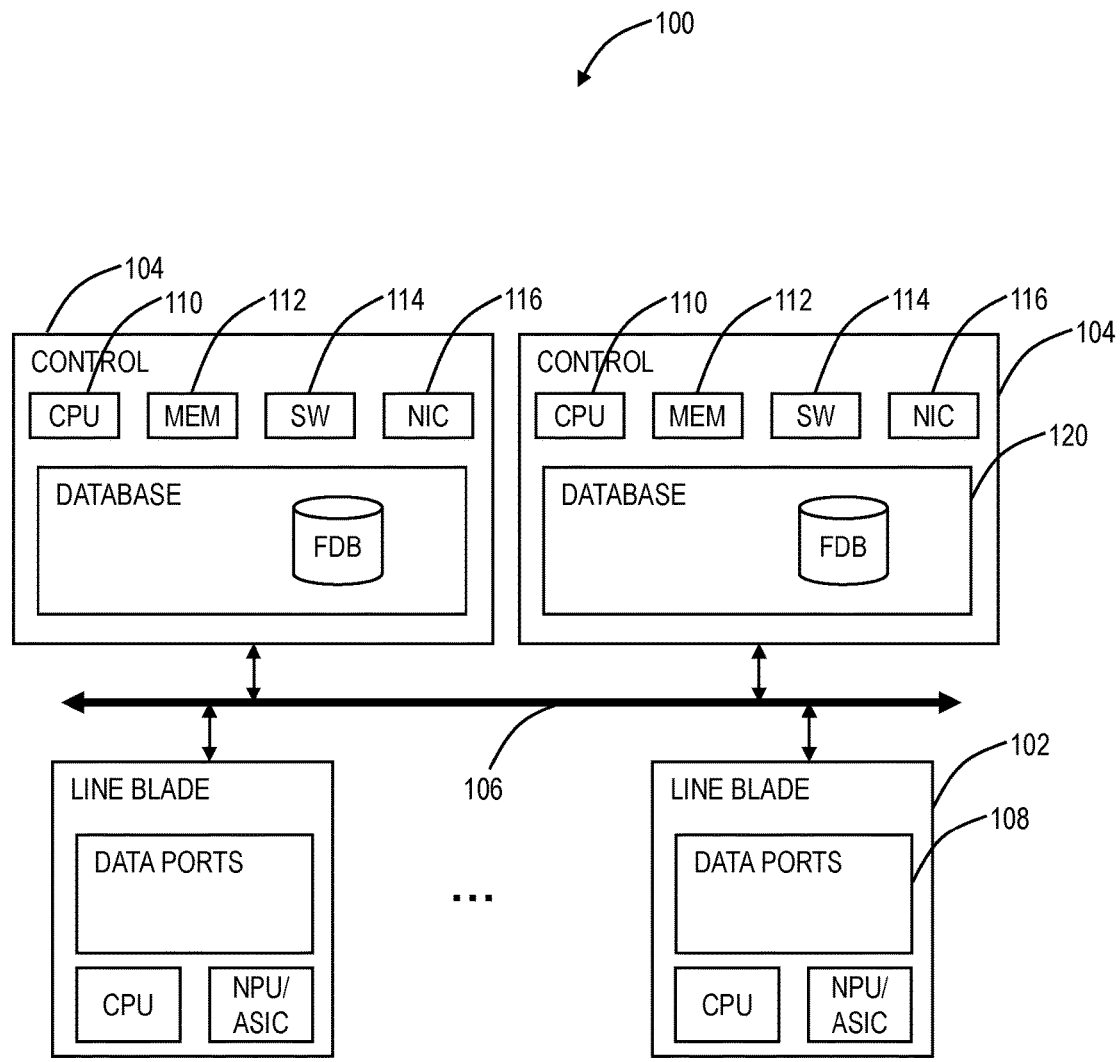
FIG. 5 is a block diagram of an exemplary implementation of a node, for implementing the systems and methods described herein.

Referring to FIG. 5, in an exemplary embodiment, a block diagram illustrates an exemplary implementation of a node 100. In this exemplary embodiment, the node 100 is an Ethernet network switch, but those of ordinary skill in the art will recognize the systems and methods described herein contemplate other types of network elements and other implementations. In this exemplary embodiment, the node 100 includes a plurality of blades 102, 104 interconnected via an interface 106. The blades 102, 104 are also known as line cards, line modules, circuit packs, pluggable modules, etc. and generally refer to components mounted on a chassis, shelf, etc. of a data switching device, i.e., the node 100. Each of the blades 102, 104 can include numerous electronic devices and optical devices mounted on a circuit board along with various interconnects including interfaces to the chassis, shelf, etc.

Two exemplary blades are illustrated with line blades 102 and control blades 104. The line blades 102 generally include data ports 108 such as a plurality of Ethernet ports. For example, the line blade 102 can include a plurality of physical ports disposed on an exterior of the blade 102 for receiving ingress/egress connections. Additionally, the line blades 102 can include switching components to form a switching fabric via the backplane 106 between all of the data ports 108 allowing data traffic to be switched between the data ports 108 on the various line blades 102. The switching fabric is a combination of hardware, software, firmware, etc. that moves data coming into the node 100 out by the correct port 108 to the next node 100. "Switching fabric" includes switching units, or individual boxes, in a node; integrated circuits contained in the switching units; and programming that allows switching paths to be controlled. Note, the switching fabric can be distributed on the blades 102, 104, in a separate blade (not shown), or a combination thereof. The line blades 102 can include an Ethernet manager (i.e., a CPU) and a Network Processor (NP)/Application Specific Integrated Circuit (ASIC). As described herein, the line blades 102 can include the buffer queuing block 80 and/or be adapted to perform the queue shaping process 50.

The control blades 104 include a microprocessor 110, memory 112, software 114, and a network interface 116. Specifically, the microprocessor 110, the memory 112, and the software 114 can collectively control, configure, provision, monitor, etc. the node 100. The network interface 116 may be utilized to communicate with an element manager, a network management system, etc. Additionally, the control blades 104 can include a database 120 that tracks and maintains provisioning, configuration, operational data and the like. The database 120 can include a Forwarding Database (FDB). In this exemplary embodiment, the node 100 includes two control blades 104 which may operate in a redundant or protected configuration such as 1:1, 1+1, etc. In general, the control blades 104 maintain dynamic system information including Layer two forwarding databases, protocol state machines, and the operational status of the ports 108 within the node 100.

Figure 6:
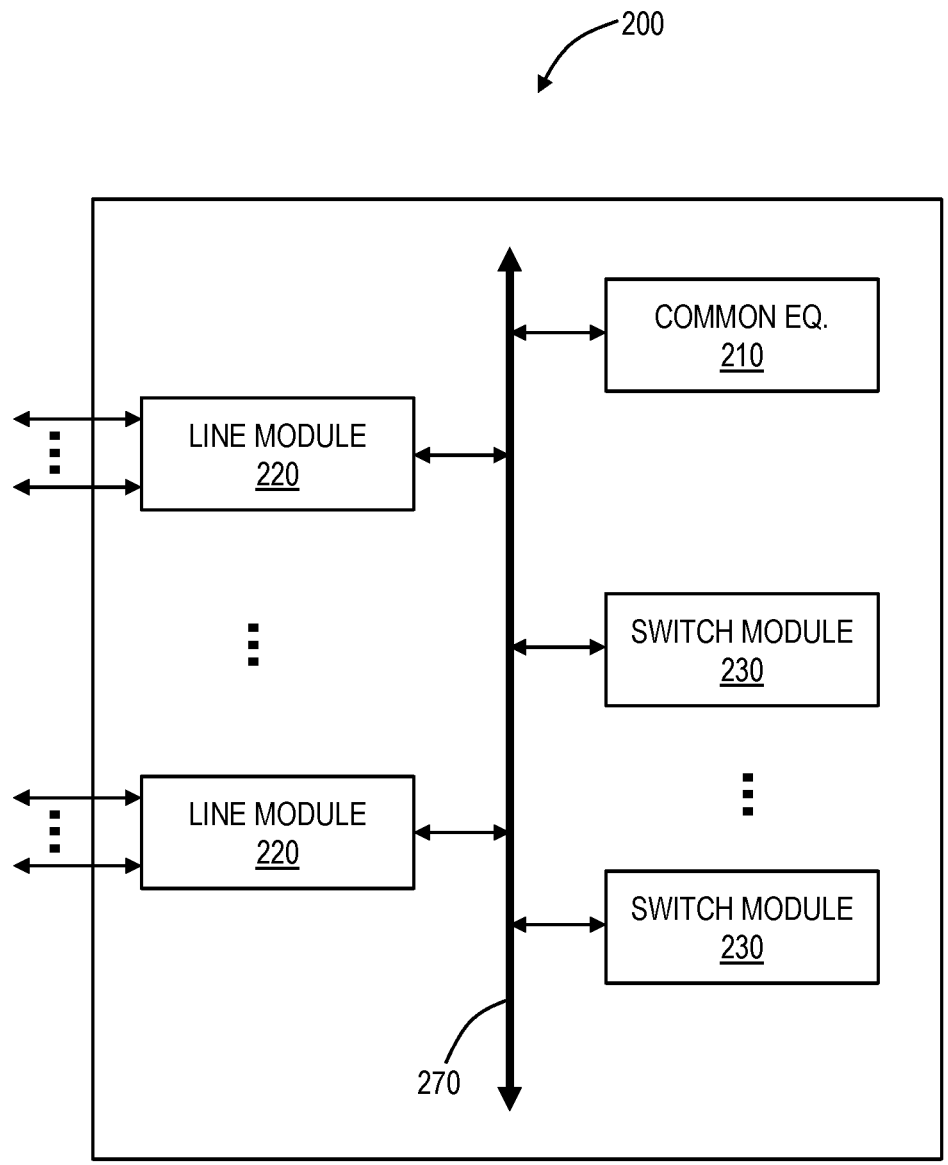
FIG. 6 is a block diagram of another exemplary implementation of a node, for implementing the systems and methods described herein.

Referring to FIG. 6, in an exemplary embodiment, a block diagram illustrates another exemplary implementation of a node 200. For example, the node 100 can be a dedicated Ethernet switch whereas the node 200 can be a multiservice platform. In an exemplary embodiment, the node 200 can be a nodal device that may consolidate the functionality of a multi-service provisioning platform (MSPP), digital cross-connect (DCS), Ethernet and Optical Transport Network (OTN) switch, dense wave division multiplexed (DWDM) platform, etc. into a single, high-capacity intelligent switching system providing Layer 0, 1, and 2 consolidation. In another exemplary embodiment, the node 200 can be any of an OTN add/drop multiplexer (ADM), a multi-service provisioning platform (MSPP), a digital cross-connect (DCS), an optical cross-connect, an optical switch, a router, a switch, a WDM terminal, an access/aggregation device, etc. That is, the node 200 can be any system with ingress and egress signals and switching of channels, timeslots, tributary units, wavelengths, etc. While the node 200 is generally shown as an optical network element, the load balancing systems and methods are contemplated for use with any switching fabric, network element, or network based thereon.

In an exemplary embodiment, the node 200 includes common equipment 210, one or more line modules 220, and one or more switch modules 230. The common equipment 210 can include power; a control module; operations, administration, maintenance, and provisioning (OAM&P) access; and the like. The common equipment 210 can connect to a management system such as a network management system (NMS), element management system (EMS), or the like. The node 200 can include an interface 270 for communicatively coupling the common equipment 210, the line modules 220, and the switch modules 230 to one another. For example, the interface 270 can be a backplane, midplane, a bus, optical or electrical connectors, or the like. The line modules 220 are configured to provide ingress and egress to the switch modules 230 and external to the node 200. In an exemplary embodiment, the line modules 220 can form ingress and egress switches with the switch modules 230 as center stage switches for a three-stage switch, e.g., a three stage Clos switch. The line modules 220 can include optical or electrical transceivers, such as, for example, 1 Gb/s (GbE PHY), 2.5 Gb/s (OC-48/STM-1, OTU1, ODU1), 10 Gb/s (OC-192/STM-64, OTU2, ODU2, 10 GbE PHY), 40 Gb/s (OC-768/STM-256, OTU3, ODU3, 40 GbE PHY), 100 Gb/s (OTU4, ODU4, 100 GbE PHY), etc.

Further, the line modules 220 can include a plurality of connections per module and each module may include a flexible rate support for any type of connection, such as, for example, 155 Mb/s, 622 Mb/s, 1 Gb/s, 2.5 Gb/s, 10 Gb/s, 40 Gb/s, and 100 Gb/s. The line modules 220 can include wavelength division multiplexing interfaces, short reach interfaces, and the like, and can connect to other line modules 220 on remote network elements, end clients, edge routers, and the like. From a logical perspective, the line modules 220 provide ingress and egress ports to the node 200, and each line module 220 can include one or more physical ports. The switch modules 230 are configured to switch channels, timeslots, tributary units, wavelengths, etc. between the line modules 220. For example, the switch modules 230 can provide wavelength granularity (Layer 0 switching); OTN granularity such as Optical Channel Data Unit-1 (ODU1), Optical Channel Data Unit-2 (ODU2), Optical Channel Data Unit-3 (ODU3), Optical Channel Data Unit-4 (ODU4), Optical Channel Data Unit-flex (ODUflex), Optical channel Payload Virtual Containers (OPVCs), etc.; Ethernet granularity; Digital Signal n (DSn) granularity such as DS0, DS1, DS3, etc.; and the like. Specifically, the switch modules 230 can include both Time Division Multiplexed (TDM) (i.e., circuit switching) and packet switching engines. The switch modules 230 can include redundancy as well, such as 1:1, 1:N, etc.

In various exemplary embodiments, the line modules 220 and/or the switch modules 230 can include the buffer queuing block 80 and/or be adapted to perform the queue shaping process 50. Those of ordinary skill in the art will recognize the nodes 100, 200 can include other components which are omitted for illustration purposes, and that the systems and methods described herein are contemplated for use with a plurality of different nodes with the nodes 100, 200 presented as an exemplary type of node. For example, in another exemplary embodiment, a node may not include the switch modules 230, but rather have the corresponding functionality in the line modules 220 (or some equivalent) in a distributed fashion. For the nodes 100, 200, other architectures providing ingress, egress, and switching are also contemplated for the systems and methods described herein. In general, the systems and methods described herein contemplate use with any node providing packet switching and/or forwarding, etc.

In an exemplary embodiment, an apparatus for per queue per service buffering capability for traffic shaping includes circuitry adapted to receive an ingress packet; circuitry adapted to, responsive to no traffic shaping, provide the ingress packet to an output interface; and circuitry adapted to, responsive to traffic shaping, one of send the ingress packet to the output interface, buffer the ingress packet in a queue based on service priority, and drop the ingress packet. The traffic shaping can include one of a token bucket algorithm and a leaky bucket algorithm. Responsive to the traffic shaping, the ingress packet is sent to the output interface if tokens are available, and tokens are deducted based on a size of the ingress packet. The queue supports traffic including a plurality of services, and wherein each of the plurality of services has an associated priority used by the service priority to determine whether or not to buffer the ingress packet. The queue can support traffic including a plurality of services defined through any of Virtual Local Area Network (VLAN) identifiers, service identifiers in IEEE 802.1ah, a Type of Service (ToS) in IP headers, and tunnel identifiers. The service priority can be one of user-defined, determined from Differentiated Services (DiffServ), and based on IEEE 802.1Q priority. The service priority can be utilized to differentiate data traffic and control traffic on the queue to provide a higher priority for the control traffic. The service priority can be utilized to differentiate voice traffic and video traffic on the queue to provide a higher priority for the voice traffic. The service priority can be utilized to make the queue behave like strict priority by provisioning highest priority to a first service such that traffic for the first service gets buffered first and will be dropped only when the queue is left with no room to buffer any further packets.

It will be appreciated that some exemplary embodiments described herein may include one or more generic or specialized processors ("one or more processors") such as microprocessors; Central Processing Units (CPUs); Digital Signal Processors (DSPs): customized processors such as Network Processors (NPs) or Network Processing Units (NPUs), Graphics Processing Units (GPUs), or the like; Field Programmable Gate Arrays (FPGAs); and the like along with unique stored program instructions (including both software and firmware) for control thereof to implement, in conjunction with certain non-processor circuits, some, most, or all of the functions of the methods and/or systems described herein. Alternatively, some or all functions may be implemented by a state machine that has no stored program instructions, or in one or more Application Specific Integrated Circuits (ASICs), in which each function or some combinations of certain of the functions are implemented as custom logic or circuitry. Of course, a combination of the aforementioned approaches may be used. For some of the exemplary embodiments described herein, a corresponding device such as hardware, software, firmware, and a combination thereof can be referred to as "circuitry configured or adapted to," "logic configured or adapted to," etc. perform a set of operations, steps, methods, processes, algorithms, functions, techniques, etc. as described herein for the various exemplary embodiments.

Moreover, some exemplary embodiments may include a non-transitory computer-readable storage medium having computer readable code stored thereon for programming a computer, server, appliance, device, processor, circuit, etc. each of which may include a processor to perform functions as described and claimed herein. Examples of such computer-readable storage mediums include, but are not limited to, a hard disk, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory), Flash memory, and the like. When stored in the non-transitory computer readable medium, software can include instructions executable by a processor or device (e.g., any type of programmable circuitry or logic) that, in response to such execution, cause a processor or the device to perform a set of operations, steps, methods, processes, algorithms, functions, techniques, etc. as described herein for the various exemplary embodiments.

Although the present disclosure has been illustrated and described herein with reference to preferred embodiments and specific examples thereof, it will be readily apparent to those of ordinary skill in the art that other embodiments and examples may perform similar functions and/or achieve like results. All such equivalent embodiments and examples are within the spirit and scope of the present disclosure, are contemplated thereby, and are intended to be covered by the following claims.

What is claimed is:

1. A method for per queue per service buffering capability for traffic shaping, the method comprising:
   receiving an ingress packet;
   responsive to no traffic shaping, providing the ingress packet to an output interface; and
   responsive to traffic shaping, performing one of i) sending the ingress packet to the output interface when tokens are available, ii) buffering the ingress packet in a queue when the tokens are not available and the queue is not full, wherein the ingress packet is buffered in the queue based on service priority such that higher priority packets are queued in the queue before lower priority packets and lowest priority packets are queued last, and iii) dropping the ingress packet based on the service priority when the tokens are not available and the queue is full, wherein the service priority is utilized to differentiate data traffic and control traffic on the queue to provide a higher priority for the control traffic, and wherein the queue is a single egress queue that buffers the ingress packet with the service priority to enable user control.

2. The method of claim 1, wherein the traffic shaping comprises one of a token bucket algorithm and a leaky bucket algorithm.

3. The method of claim 1, wherein, responsive to the traffic shaping, the sending the ingress packet to the output interface is performed if the tokens are available and tokens are deducted based on a size of the ingress packet.

4. The method of claim 1, wherein the queue supports traffic comprising a plurality of services, and wherein each of the plurality of services has an associated priority used by the service priority to determine whether or not to buffer the ingress packet.

5. The method of claim 1, wherein the queue supports traffic comprising a plurality of services defined through any of Virtual Local Area Network (VLAN) identifiers, service identifiers in IEEE 802.1ah, a Type of Service (ToS) in IP headers, and tunnel identifiers.

6. The method of claim 1, wherein the service priority is one of user-defined, determined from Differentiated Services (Diff-Serv), and based on IEEE 802.1Q priority.

7. The method of claim 1, wherein the service priority is utilized to differentiate voice traffic and video traffic on the queue to provide a higher priority for the voice traffic.

8. The method of claim 1, wherein the service priority is utilized to make the queue behave like strict priority by provisioning highest priority to a first service such that traffic for the first service gets buffered first and will be dropped only when the queue is left with no room to buffer any further packets.

9. An apparatus for per queue per service buffering capability for traffic shaping, the apparatus comprising:
circuitry adapted to receive an ingress packet;
circuitry adapted to, responsive to no traffic shaping, provide the ingress packet to an output interface; and
circuitry adapted to, responsive to traffic shaping, perform one of i) send the ingress packet to the output interface when tokens are available, ii) buffer the ingress packet in a queue based on service priority when the tokens are not available and the queue is not full such that higher priority packets are queued in the queue before lower priority packets and lowest priority packets are queued last, and iii) drop the ingress packet when the tokens are not available and the queue is full, wherein the service priority is utilized to differentiate data traffic and control traffic on the queue to provide a higher priority for the control traffic, and wherein the queue is a single egress queue that buffers the ingress packet with the service priority to enable user control.

10. The apparatus of claim 9, wherein the traffic shaping comprises one of a token bucket algorithm and a leaky bucket algorithm.

11. The apparatus of claim 9, wherein, responsive to the traffic shaping, the ingress packet is sent to the output interface if the tokens are available and tokens are deducted based on a size of the ingress packet.

12. The apparatus of claim 9, wherein the queue supports traffic comprising a plurality of services, and wherein each of the plurality of services has an associated priority used by the service priority to determine whether or not to buffer the ingress packet.

13. The apparatus of claim 9, wherein the queue supports traffic comprising a plurality of services defined through any of Virtual Local Area Network (VLAN) identifiers, service identifiers in IEEE 802.1ah, a Type of Service (ToS) in IP headers, and tunnel identifiers.

14. The apparatus of claim 9, wherein the service priority is one of user-defined, determined from Differentiated Services (Diff-Serv), and based on IEEE 802.1Q priority.

15. The apparatus of claim 9, wherein the service priority is utilized to differentiate voice traffic and video traffic on the queue to provide a higher priority for the voice traffic.

16. The apparatus of claim 9, wherein the service priority is utilized to make the queue behave like strict priority by provisioning highest priority to a first service such that traffic for the first service gets buffered first and will be dropped only when the queue is left with no room to buffer any further packets.

17. A node adapted for per queue per service buffering capability for traffic shaping, the node comprising:
one or more line ports comprising circuitry adapted to receive an ingress packet; and
circuitry adapted to, responsive to no traffic shaping, provide the ingress packet to an output interface; and
circuitry adapted to, responsive to traffic shaping, perform one of i) send the ingress packet to the output interface when tokens are available, ii) buffer the ingress packet in a queue based on service priority when the tokens are not available and the queue is not full such that higher priority packets are queued in the queue before lower priority packets and lowest priority packets are queued last, and iii) drop the ingress packet when the tokens are not available and the queue is full, wherein the service priority is utilized to differentiate data traffic and control traffic on the queue to provide a higher priority for the control traffic, and wherein the queue is a single egress queue that buffers the ingress packet with the service priority to enable user control.

18. The node of claim 17, wherein the traffic shaping comprises one of a token bucket algorithm and a leaky bucket algorithm.

* * * * *